May 2, 1950 H. B. CARBON 2,506,063
VALVE OPERATING MECHANISM
Filed March 14, 1945 2 Sheets-Sheet 1
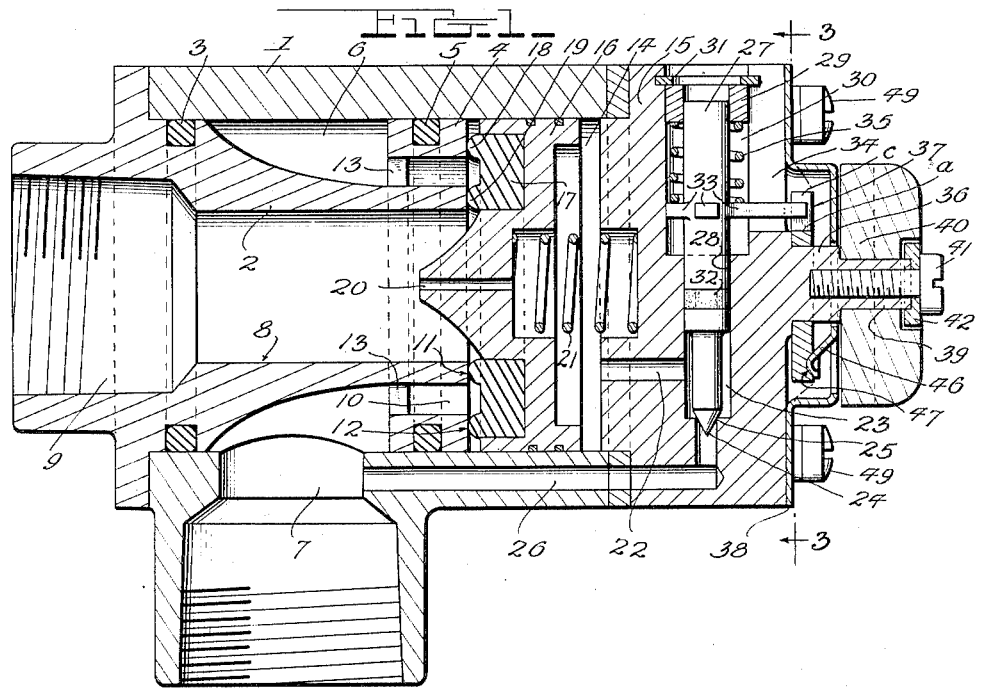
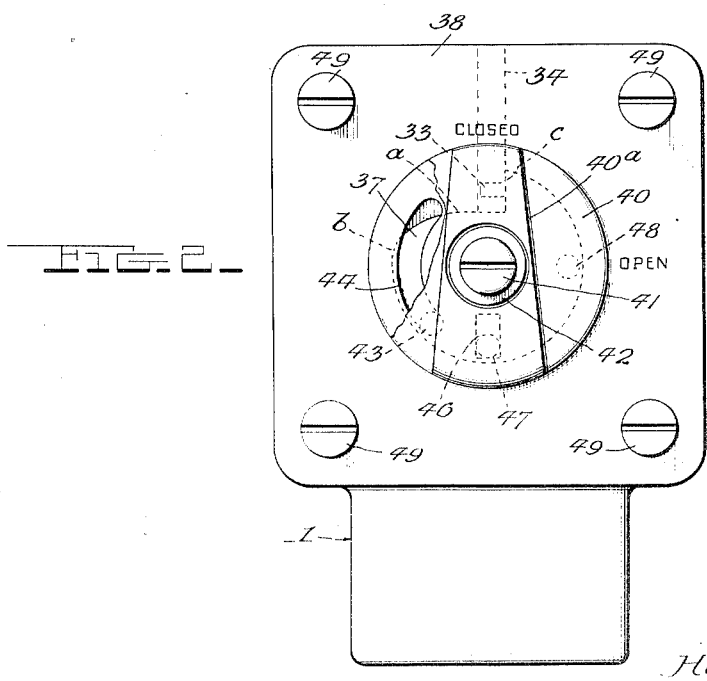
INVENTOR.
Harry B. Carbon
BY Mason, Porter & Diller
Attys May 2, 1950     H. B. CARBON     2,506,063
VALVE OPERATING MECHANISM
Filed March 14, 1945     2 Sheets-Sheet 2
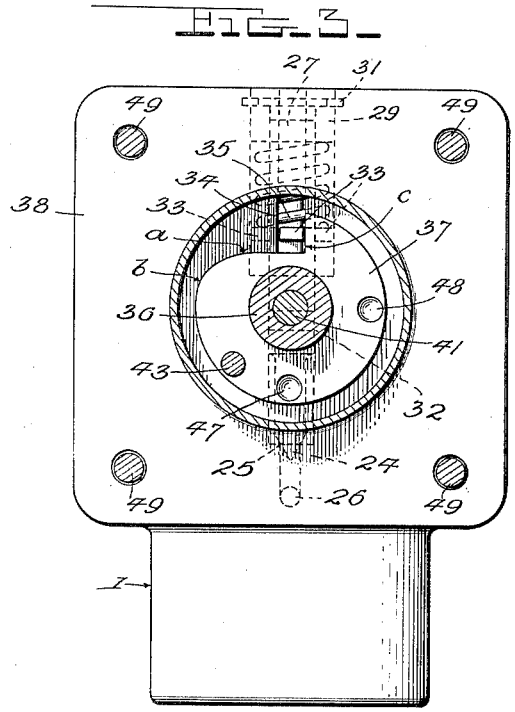
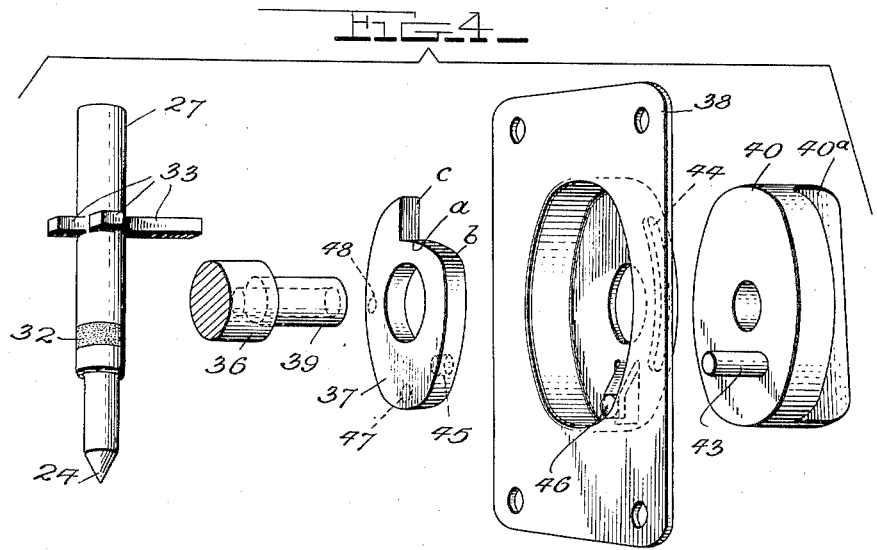
INVENTOR.
Harry B. Carbon
BY
Mason, Porter & Diller
Attys.

Patented May 2, 1950

2,506,063

UNITED STATES PATENT OFFICE 2,506,063

VALVE OPERATING MECHANISM

Harry B. Carbon, Cleveland, Ohio, assignor to The Parker Appliance Company, Cleveland, Ohio, a corporation of Ohio Application March 14, 1945, Serial No. 582,694

2 Claims. (Cl. 251—132)

The invention relates to new and useful improvements in an operating mechanism for moving a valve to open or closed position at will.

An object of the invention is to provide a valve operating mechanism wherein the valve is moved away from its seat by a cam disposed at one side of the carrier for the valve and making contact with a member projecting laterally from the carrier.

A further object of the invention is to provide a valve operating mechanism of the above type wherein the carrier is mounted in bearings spaced from each other and the projecting member is disposed between said bearings.

A further object of the invention is to provide a valve operating mechanism of the above type wherein the operating cam is mounted for oscillation about an axis at right angles to the axis of the carrier and the projecting member contacts with the peripheral edge thereof.

These and other objects will in part be obvious and will in part be hereinafter more fully disclosed.

In the drawings, which show by way of illustration one embodiment of the invention—

Figure 1 is a longitudinal sectional view through a valve assembly including the improvements;

Figure 2 is an end view of the valve assembly as viewed from the right in Figure 1;

Figure 3 is a sectional view on the line 3—3 of Figure 1;

Figure 4 is a perspective view of the valve carrier, the actuating cam and the parts directly associated therewith, with the parts separated from each other.

Fig. 5 is an end view of the valve carrier.

The invention as shown in the drawings is utilized for operating a pilot valve associated with a valve assembly wherein the main valve is operated by the fluid pressure on the line. While the fluid pressure operated valve mechanism per se is no part of the present invention, it will be briefly described in order that a better understanding may be had of the operating means for the pilot valve associated therewith.

The valve assembly includes a casing 1 in which is positioned an adaptor 2 having a sealed contact 3 with one of the outer ends of the casing. Said adaptor extends for a short distance into the valve casing and has an annular member 4 which contacts with the inner wall of the casing. There is also a seal 5 at the inner end of the adaptor. The adaptor is cut away between the seals 3 and 5 so as to provide a chamber 6 which surrounds the adaptor. This chamber 6 is connected to an outlet 7. The adaptor has a central passage 8 therethrough which is connected to the inlet 9.

The inner end of the adaptor is provided with an annular channel 10 at the inner side of which is a valve seat 11 and at the outer side of which is a valve seat 12. Arcuate ports 13 connect the annular channel 10 with the chamber 6.

The adaptor terminates within the casing, leaving a valve chamber 14 between the valve seats and the closure head 15 for the cylindrical casing 1. In this valve chamber 14 is a valve 16 which is mounted for free movement in the chamber. There are no gaskets between the valve and the cylindrical casing. The valve has an annular recess formed therein in which is placed a gasket 17 of deformable material, preferably rubber. Said gasket has an annular projecting portion 18 which engages the valve seat 12 and an annular projecting portion 19 which engages the valve seat 11.

Centrally through the valve is a relatively small passage 20. A coil spring 21 is disposed between the head 15 and the valve and normally moves the valve to closed position. The closure head 15 is provided with a passage 22 which leads to a chamber 23 in which is located a pilot valve 24. The pilot valve cooperates with the valve seat 25. There is a passage 26 connecting the chamber 23 with the outlet side of the valve assembly. When the pilot valve is seated, the passage 22 is closed. Fluid from the inlet side of the line will pass through the small passage 20 in the valve and build up a pressure on the outer side of the valve so that the fluid pressure is substantially balanced on both sides of the valve and the spring will move the valve to closed position. When in closed position, the area subjected to fluid pressure on the outside of the valve is considerably greater than the area subjected to pressure on the inside of the valve and the valve will be firmly held closed.

When the pilot valve 24 is moved to open position, fluid will flow from the valve chamber 14 at the outer side of the valve 16 to the outlet side of the valve assembly. This passage 22 is larger than the passage 20 and therefore when the pilot is in full open position, fluid will flow from the chamber 14 faster than it will flow into the chamber from the passage 20. As the result, the pressure on the inside of the valve will dominate the pressure on the outside of the valve and the valve will be moved to open position. This valve assembly is shown, described and claimed in a copending application of Arthur L. Parker, deceased, Serial Number 593,795, filed May 15, 1945, now Patent 2,426,900, granted September 2, 1947.

The present improvement has to do with the mounting of the pilot valve and the operating mechanism therefor. The pilot valve is mounted in the closure head 15 of the valve assembly. The pilot valve 24 is mounted at the inner end of a cylindrical carrier 27. This carrier 27 has a reduced part at the inner end thereof which carries the valve proper. The valve is tapered like a needle valve and contacts with the seat 25.

The cylindrical carrier 27 is mounted for reciprocation in a bearing 28 which is an integral part of the closure head and also in a bearing ring 29 mounted in a recess 30 formed in the closure head. Said ring 29 is held in the chamber by means of a snap ring 31. The cylindrical carrier is provided with an annular groove in which is placed a gasket 32. The carrier has laterally projecting arms 33. There are preferably four of these arms and one of the arms is extended laterally through a slot 34 in the closure head. This slot 34 extends radially of the axis of rotation of the cam and is so dimensioned that when the cam engages the arm, the slot will prevent lateral movement of the arm and cause the same to move in a direction radially of the cam and longitudinally of the axis of the carrier.

A coil spring 35 bears at its upper end against the bearing ring 29 and at its lower end against the arms 33. This spring normally forces the valve into contact with the seat 25.

The closure head is provided with a cylindrical extension 36 on which an actuating cam 37 is mounted for oscillation. This cam is positioned so that it will contact with the arm 33 when it is turned and will force the arm 33 and the carrier outward, compressing the spring and moving the valve away from its seat. The cam has a minimum radius at the point $a$ which increases rapidly to the point $b$ and from the point $b$ the cam member is substantially concentric and of maximum diameter.

As noted in Figure 3, the arm 33 lies close to the shoulder $c$ on the cam. When the cam is rotated in a clockwise direction as viewed in this figure, it will be brought into contact with the arm 33 and will shift the arm and the carrier outwardly so as to move the valve away from its seat. When the cam is turned in a counter-clockwise direction, the arm 33 will be released and the spring will move the valve into engagement with the seat 25.

A cover plate 38 is attached to the closure head and is shaped so as to provide a housing for the control cam 37. This cover plate has an opening centrally thereof and the closure head has a further extension 39 on which is mounted for free rotation a manually operated hand piece 40. Said manually operated hand piece is secured to the extension 39 by means of a bolt 41 threaded into the closure head and bearing on a washer 42.

This hand piece 40 has a pin 43 projecting inwardly therefrom (see Figure 4). The pin extends through an arcuate slot 44 in the cover 38 and engages an opening 45 formed in the cam 37. When this hand piece is turned, it will, through this pin, turn the cam. Through this hand piece the cam can therefore be manually oscillated in a clockwise direction for moving the valve to open position and in a counter-clockwise direction for releasing the valve so it will be moved by the spring to closed position.

As a means for holding the cam in its set positions, the cover 38 is provided with a struck-up yielding finger 46 having a rounded free end which is adapted to engage the recess 47 in the face of the cam 37 when the valve is in closed position, and to engage the recess 48 when the valve has been moved to open position. To facilitate the turning of the hand piece 40, it is provided with a raised portion 40a which extends diametrically across the same. The cover plate 38 is marked so as to indicate the closed position of the valve and the open position thereof. The cover plate and the closure head 15 are secured to the valve casing by bolts 49.

It is obvious that minor changes in the details of construction and arrangement of parts may be made without departing from the spirit of the invention as set forth in the appended claims.

I claim:

1. A valve assembly comprising a casing, a valve seat therein, a valve adapted to engage said seat, a carrier for said valve, spaced bearings in which said carrier is mounted for reciprocation, a spring operating on the carrier for seating the valve, said casing having a cylindrical projection, a cam mounted on said cylindrical projection for oscillation about an axis at right angles to the axis of the carrier, means projecting laterally from the carrier intermediate said bearings for engagement by said cam, a cover for said cam having a central opening therethrough, said cylindrical projection having an extension, a manually operable hand-piece mounted on said extension for oscillation, and a pin carried by said hand-piece and extending through a slot in the cap into engagement with the cam for oscillating the same.

2. A valve assembly comprising a casing, a valve seat therein, a valve adapted to engage said seat, a carrier for said valve, spaced bearings in which said carrier is mounted for reciprocation, a spring operating on the carrier for seating the valve, said casing having a cylindrical projection, a cam mounted on said cylindrical projection for oscillation about an axis at right angles to the axis of the carrier, means projecting laterally from the carrier intermediate said bearings for engagement by said cam, a cover for said cam having a central opening therethrough, said cylindrical projection having an extension, a manually operable hand-piece mounted on said extension for oscillation, and a pin carried by said hand-piece and extending through a slot in the cap into engagement with the cam for oscillating the same, said cap being provided with a spring detent adapted to engage recesses in said cam for holding the same from turning when the valve is in open position and when it is closed.

HARRY B. CARBON.

REFERENCES CITED

The following references are of record in the file of this patent:

UNITED STATES PATENTS

| Number | Name | Date |
|---|---|---|
| 17,604 | Coffin | June 16, 1857 |
| 789,561 | Pasman | May 9, 1905 |
| 1,146,012 | Mason | July 13, 1915 |
| 1,563,916 | Nieberding | Dec. 1, 1925 |
| 1,609,193 | Pratt | Nov. 30, 1926 |
| 1,762,178 | Lear | June 10, 1930 |
| 1,775,499 | Rosenthal | Sept. 9, 1930 |
| 1,982,550 | Skuttle | Nov. 27, 1934 |
| 2,101,356 | Zak | Dec. 7, 1937 |
| 2,342,653 | Edwards | Feb. 29, 1944 |